United States Patent
Suganuma et al.

(10) Patent No.: US 8,968,815 B2
(45) Date of Patent: *Mar. 3, 2015

(54) METHOD FOR PRODUCING FATS AND OILS

(75) Inventors: Tomomi Suganuma, Yokosuka (JP); Masato Takaba, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 395 days.

This patent is subject to a terminal disclaimer.

(21) Appl. No.: 13/254,996

(22) PCT Filed: Mar. 8, 2010

(86) PCT No.: PCT/JP2010/053788
§ 371 (c)(1),
(2), (4) Date: Sep. 6, 2011

(87) PCT Pub. No.: WO2010/101289
PCT Pub. Date: Sep. 10, 2010

(65) Prior Publication Data
US 2011/0318453 A1   Dec. 29, 2011

(30) Foreign Application Priority Data
Mar. 6, 2009  (JP) ................. 2009-053820

(51) Int. Cl.
| A23D 9/02 | (2006.01) |
| A23D 9/00 | (2006.01) |
| C11C 3/10 | (2006.01) |
| C11B 3/00 | (2006.01) |
| C11B 7/00 | (2006.01) |

(52) U.S. Cl.
CPC ... *C11C 3/10* (2013.01); *A23D 9/00* (2013.01); *C11B 3/008* (2013.01); *C11B 7/00* (2013.01); *C11B 7/0025* (2013.01); *C11B 7/0083* (2013.01)
USPC .......................... 426/607; 426/601

(58) Field of Classification Search
CPC ........... A23D 9/00; C11B 3/008; C11B 7/00; C11B 7/0025; C11B 7/0083; C11C 3/10
USPC ................................. 426/601, 607
See application file for complete search history.

(56) References Cited

U.S. PATENT DOCUMENTS

| 4,004,041 | A | 1/1977 | Koslowsky |
| 4,268,527 | A | 5/1981 | Matsuo et al. |
| 4,985,358 | A | 1/1991 | Sawamura et al. |
| 5,928,704 | A | 7/1999 | Takeda et al. |
| 8,389,754 | B2 * | 3/2013 | Arimoto et al. ............... 554/221 |
| 2004/0152908 | A1 | 8/2004 | Okada et al. |
| 2006/0165867 | A1 | 7/2006 | Kuwabara et al. |
| 2007/0160739 | A1 | 7/2007 | Kuwabara et al. |
| 2010/0222607 | A1 | 9/2010 | Arimoto et al. |
| 2010/0255152 | A1 | 10/2010 | Arimoto et al. |

FOREIGN PATENT DOCUMENTS

| CN | 1033527 A | 6/1989 |
| EP | 1 548 094 A1 | 6/2005 |
| JP | 51-84805 A | 7/1976 |
| JP | 55-071797 A | 5/1980 |
| JP | 61-224934 A | 10/1986 |
| JP | 62-061589 A | 3/1987 |
| JP | 62-155048 A | 7/1987 |
| JP | 6-181686 A | 7/1994 |
| JP | 7-155107 A | 6/1995 |
| JP | 9-103244 A | 4/1997 |
| JP | 10-025491 A | 1/1998 |
| JP | 11-246893 A | 9/1999 |
| JP | 2002-069484 A | 3/2002 |
| WO | WO 03-000832 A1 | 1/2003 |
| WO | WO 2004-029185 A1 | 4/2004 |
| WO | WO 2005/063952 A1 | 7/2005 |
| WO | WO 2009/031680 A1 | 3/2009 |

OTHER PUBLICATIONS

Office Action (First Office Action) dated Oct. 31, 2012, issued by the Chinese Patent Office in corresponding Chinese Patent Application No. 201080019961.7. (7 pages).

International Search Report (PCT/ISA/210) issued on Jun. 8, 2010, by Japanese Patent Office as the International Searching Authority for International Application No. PCT/JP2010/053788.

Written Opinion (PCT/ISA/237) issued on Jun. 8, 2010, by Japanese Patent Office as the International Searching Authority for International Application No. PCT/JP2010/053788.

* cited by examiner

*Primary Examiner* — Humera Sheikh
*Assistant Examiner* — Saeeda Latham
(74) *Attorney, Agent, or Firm* — Buchanan, Ingersoll & Rooney PC

(57) ABSTRACT

The present invention discloses a safer, more effective and industrially suitable method for producing fats and oils rich in a XUX triglyceride wherein the contents of a XXX triglyceride and a XX diglyceride are low which comprises, upon removing by crystallization a XXX triglyceride and a XX diglyceride each of which is contained in fats and oils comprising 50 to 90 mass % of a XUX triglyceride in total triglycerides, the step of conducting such removing by crystallization in the presence of a fatty acid lower alkyl ester. This method is a more efficient and industrially suitable method for producing fats and oils rich in a XUX triglyceride wherein the contents of a XXX triglyceride and a XX diglyceride are low.

8 Claims, No Drawings

METHOD FOR PRODUCING FATS AND OILS

TECHNICAL FIELD OF THE INVENTION

The present invention relates to methods for producing fats and oils rich in a triglyceride comprising saturated fatty acid residues on the first and third positions and an unsaturated fatty acid residue on the second position (XUX triglyceride), wherein the content of a triglyceride comprising saturated fatty acid residues on all of the first to third positions (XXX triglyceride or XXX TG) and the content of a diglyceride comprising saturated fatty acid residues on any two positions among the first to third positions (XX diglyceride or XX DG) are low.

BACKGROUND OF THE INVENTION

Hard butter including cocoa butter is widely used in foods such as confectionery products involving chocolates and bread products, pharmaceutical products, cosmetics, or the like. The above hard butter consists primarily of symmetric di-saturated mono-unsaturated triglycerides having one unsaturated bond in a molecule such as 1,3-dipalmitoyl-2-oleoyl-glycerol (POP), a triglyceride having an oleoyl group on the second position and each one group of a palmitoyl group and a stearoyl group (POS), and 1,3-distearoyl-2-oleoyl-glycerol (SOS). Such hard butter is known as tempering fats for chocolates. Further, symmetric di-saturated mono-unsaturated triglycerides having two unsaturated bonds in a molecule such as 1,3-distearoyl-2-linoleoyl glycerol (SLS) which have good quality as a chocolate tempering agent are also known.

Generally, these triglycerides can be obtained as natural fats and oils containing such compound(s), e.g. palm oil, shea butter, sal butter, and illipe butter; or as fractionated oils thereof. Further, other than the triglycerides obtained as fractionated oil of fats and oils such as palm oil, shea butter, sal butter, and illipe butter, it is proposed that such triglycerides can also be obtained by the method which comprises the steps of reacting 1,3-selective lipase to a specific fat or oil; and transesterifying them to produce the triglycerides (Patent Literatures 1 to 3).

In each of the above methods, fractionation is conducted to obtain an end product. However, in order to improve the quality thereof, solvent fractionation or complicated process control is required, and therefore, the above methods are not satisfactory in terms of production efficiency.

Patent Literature 4 discloses a method for producing hard butter without a fractionation process which comprises multistage transesterification comprising the steps of reacting 1,3-selective lipase to a mixture of glyceride fats and oils rich in unsaturated fatty acids on the second position and a fatty acid ester rich in saturated fatty acids and/or a free fatty acid to obtain a reactant; distilling the reactant to obtain a distillation residue wherefrom a part or all of the fatty acid ester and/or the free fatty acid is collected; and repeating the processes of mixing a fatty acid ester rich in saturated fatty acids and/or a free fatty acid to the distillation residue and reacting 1,3-selective lipase thereto. However, by the transesterification, a XXX triglyceride and a XX diglyceride are actually produced as by-products in amounts which cannot be ignored in terms of the quality of hard butter. Thus, it is difficult to produce a tempering cocoa butter equivalent by a multistage transesterification process only.

Patent Literature 1: JP 55-71797 A
Patent Literature 2: JP 62-155048 A
Patent Literature 3: WO 2005/063952
Patent Literature 4: WO 2003/000832

DISCLOSURE OF THE INVENTION

The object of the present invention is to provide a more effective and industrially suitable method for producing fats and oils rich in a XUX triglyceride wherein the contents of a XXX triglyceride and a XX diglyceride are low.

The present invention has been completed based on the finding that a XXX triglyceride and a XX diglyceride each of which is contained in fats and oils comprising a specific amount of a XUX triglyceride can be effectively removed by fractionating fats and oils comprising a specific amount of a XUX triglyceride in the presence of a fatty acid lower alkyl ester.

Namely, the first invention provides a method for producing fats and oils which comprises the steps of cooling fats and oils in a molten state comprising 50 to 90 mass % of a XUX triglyceride in total triglycerides in the presence of 1 to 50 mass % of a fatty acid lower alkyl ester to precipitate crystals; and conducting solid-liquid separation to obtain fats and oils wherein a XXX triglyceride and a XX diglyceride are decreased in an olein part (a liquid part).

The second invention provides the method for producing fats and oils according to the first invention, wherein the fats and oils comprising 50 to 90 mass % of a XUX triglyceride in total triglycerides are derived from a distillation residue obtained by following steps A to C:

A: a step of mixing a fatty acid lower alkyl ester and fats and oils comprising triglycerides rich in unsaturated fatty acid residues on the second position thereof to obtain a mixture;
B: a step of transesterifying the mixture with 1,3-selective lipase; and
C: a step of conducting distillation to the transesterified reactant and distilling a part or all of the fatty acid lower alkyl ester to obtain a distillation residue.

The third invention provides the method for producing fats and oils according to the first invention, wherein the fats and oils comprising 50 to 90 mass % of a XUX triglyceride in total triglycerides are derived from a distillation residue of a multistage transesterification reactant obtained by conducting A-B-C and then repeating D-B-C once or more in following steps A to D:

A: a step of mixing a fatty acid lower alkyl ester and fats and oils comprising triglycerides rich in unsaturated fatty acid residues on the second position thereof to obtain a mixture;
B: a step of transesterifying the mixture with 1,3-selective lipase;
C: a step of conducting distillation to the transesterified reactant and distilling a part or all of the fatty acid lower alkyl ester to obtain a distillation residue; and
D: a step of mixing the distillation residue of above C and a fatty acid lower alkyl ester to obtain a mixture.

The fourth invention provides hard butter comprising the fats and oils produced according to any one of the first to third inventions.

The fifth invention provides foods comprising the hard butter according to the fourth invention.

According to the present invention, when removing by crystallization a XXX triglyceride and a XX diglyceride each of which is contained in fats and oils comprising 50 to 90 mass % of a XUX triglyceride in total triglycerides, it becomes possible to provide a safer, more effective and industrially suitable method for producing fats and oils rich in a XUX triglyceride wherein the contents of a XXX triglyceride and a XX diglyceride are low by using a fatty acid lower alkyl ester which is used as a raw material of transesterification.

Particularly, it is possible to provide a more effective method for producing fats and oils rich in a XUX triglyceride wherein the contents of a XXX triglyceride and a XX diglyceride are low by using fats and oils comprising 50 to 90 mass % of a XUX triglyceride in total triglycerides derived from a distillation residue (preferably a distillation residue obtained by multistage transesterification) obtained by transesterifying fats and oils rich in unsaturated fatty acids on the second position thereof and a saturated fatty acid lower alkyl ester with 1,3-selective lipase; and then distilling it to obtain a distillation residue.

BEST MODE FOR CARRYING OUT THE INVENTION

The method for producing fats and oils rich in a XUX triglyceride wherein the contents of a XXX triglyceride and a XX diglyceride are low of the present invention is hereinafter described in detail.

A XUX triglyceride of the present invention is a symmetric triglyceride comprising saturated fatty acid residues on the first and third positions and an unsaturated fatty acid residue on the second position. As for a fatty acid residue constituting a XUX triglyceride, in terms of availability in the food industry, a saturated fatty acid residue X preferably has 12 to 26 carbon atoms and more preferably 16 to 22 carbon atoms. Particularly, a palmitoyl group, a stearoyl group or a behenoyl group is preferable. Further, an unsaturated fatty acid residue U preferably has 16 to 26 carbon atoms and more preferably 16 to 22 carbon atoms. The unsaturation degree of an unsaturated fatty acid is preferably 1 to 6 and more preferably 1 to 3. Particularly preferable examples of an unsaturated fatty acid residue include an oleoyl group, a linoleoyl group and a linolenoyl group.

In the production method of the present invention, it is required that fats and oils comprising 50 to 90 mass % of a XUX triglyceride in total triglycerides are used as a crystallization raw material. Considering quality and economic efficiency, the content of a XUX triglyceride in total triglycerides is preferably more than 60 mass % and 90 mass % or less, more preferably 70 to 90 mass % and most preferably 75 to 85 mass %.

In the production method of the present invention, fats and oils comprising 50 to 90 mass % of a XUX triglyceride in total triglycerides which are used as a crystallization raw material are preferably those comprising 85 mass % or more of triglycerides, more preferably 90 mass % or more thereof, and most preferably 94 mass % or more thereof. For example, fats and oils fractionating palm oil, shea butter, sal butter, illipe butter or the like can be used. It is particularly preferable in production efficiency that fats and oils are derived from a distillation residue obtained by reacting 1,3-selective lipase to a mixture of fats and oils and a fatty acid lower alkyl ester to conduct transesterification, and distilling a part of or all of the fatty acid lower alkyl ester. It is further preferable in production efficiency that fats and oils are derived from a distillation residue comprising 70 to 90 mass % of a XUX triglyceride in total triglycerides obtained by multistage transesterification comprising the steps of reacting 1,3-selective lipase to a mixture of fats and oils and a fatty acid lower alkyl ester to conduct transesterification; distilling a part of or all of the fatty acid lower alkyl ester to obtain a distillation residue; and then repeating the processes of newly mixing a fatty acid lower alkyl ester to the distillation residue and reacting 1,3-selective lipase to conduct transesterification, and distilling a part of or all of the fatty acid lower alkyl ester to obtain a distillation residue.

In fats and oils used in the above transesterification, an unsaturated fatty acid residue on the second position of triglycerides constituting fats and oils is preferably 70 mass % or more, more preferably 80 mass % or more and most preferably 90 mass % or more. It is preferable that an unsaturated fatty acid residue on the second position of triglycerides constituting fats and oils is one or more kinds selected from the group consisting of an oleoyl group, a linoleoyl group and a linolenoyl group. As for a fatty acid lower alkyl ester used in the transesterification, a saturated fatty acid lower alkyl ester is preferably 70 mass % or more, more preferably 80 mass % or more and most preferably 90 mass % or more. A saturated fatty acid residue of a saturated fatty acid lower alkyl ester is preferably a saturated fatty acid residue having 16 to 22 carbon atoms, and more preferably one or more kinds selected from the group consisting of a stearoyl group, a palmitoyl group and a behenoyl group.

In the present invention, fats and oils are, in the case of a mixture with a fatty acid lower alkyl ester, defined as those from that a fatty acid lower alkyl ester is excluded. Therefore, in the case of using a distillation residue after the transesterification (preferably the multistage transesterification) as mentioned above, fats and oils comprising 50 to 90 mass % of a XUX triglyceride in total triglycerides correspond to the fats and oils from which a fatty acid lower alkyl ester remaining in the distillation residue is excluded.

In the production method of the present invention, fats and oils comprising 50 to 90 mass % of a XUX triglyceride in total triglycerides which are used as a crystallization raw material preferably comprise 0.5 to 6 mass % of a XXX triglyceride. Further, such fats and oils preferably comprise 0.5 to 6 mass % of a XX diglyceride. When the content of a XXX triglyceride and/or a XX diglyceride is within the above range, the XXX triglyceride and/or the XX diglyceride can be effectively removed by crystallization in the presence of a fatty acid lower alkyl ester. Fats and oils comprising 50 to 90 mass % of a XUX triglyceride in total triglycerides more preferably comprise 1.0 to 5 mass % of a XXX triglyceride and most preferably comprise 1.5 to 4 mass % thereof. Further, fats and oils comprising 50 to 90 mass % of a XUX triglyceride in total triglycerides more preferably comprise 1.0 to 5 mass % of a XX diglyceride and most preferably comprise 1.5 to 4 mass % thereof.

In the production method of the present invention, fats and oils comprising 50 to 90 mass % of a XUX triglyceride in total triglycerides are fractionated through the cooling crystallization process in the presence of 1 to 50 mass % of a fatty acid lower alkyl ester.

Namely, in the production method of the present invention, a crystallization raw material which comprises 1 to 50 mass % of a fatty acid lower alkyl ester and 50 to 90 mass % of a XUX triglyceride in total triglycerides of fats and oils from that a fatty acid lower alkyl ester is excluded is fractionated through the cooling crystallization process to obtain fats and oils rich in a XUX triglyceride wherein the contents of a XXX triglyceride and a XX diglyceride are low. The fractionation is preferably conducted in the presence of 1 to 30 mass % of a fatty acid lower alkyl ester, more preferably in the presence of 4 to 25 mass % thereof and most preferably 7 to 23 mass % thereof. The above range of a fatty acid lower alkyl ester is preferable because a XXX triglyceride and a XX diglyceride can be effectively removed by crystallization from fats and oils comprising 50 to 90 mass % of a XUX triglyceride in total triglycerides.

A fatty acid lower alkyl ester is not particularly limited, and preferably lower alcohol esters of fatty acids having 16 to 22 carbon atoms (for example, a palmitic acid, a stearic acid, an arachic acid, a behenic acid, an oleic acid, a linoleic acid or a linolenic acid), and particularly preferably esters of unsaturated fatty acids and alcohols having 1 to 6 carbon atoms. Particularly, methanol, ethanol or isopropyl alcohol is preferable, and ethanol is further more preferable in terms of processing edible fats and oils. The content of an unsaturated fatty acid lower alkyl ester in a fatty acid lower alkyl ester is preferably 5 to 100 mass %, and more preferably 10 to 100 mass %. The above range of the content of an unsaturated fatty acid lower alkyl ester in a fatty acid lower alkyl ester is preferable because a XXX triglyceride and a XX diglyceride can be effectively removed by crystallization from fats and oils comprising 50 to 90 mass % of a XUX triglyceride in total triglycerides.

In the production method of the present invention, fats and oils rich in a XUX triglyceride wherein the contents of a XXX triglyceride and a XX diglyceride are low can be obtained in an olein part (a liquid part) by cooling fats and oils comprising 50 to 90 mass % of a XUX triglyceride in total triglycerides in the presence of a fatty acid lower alkyl ester to precipitate crystals of a XXX triglyceride and a XX diglyceride; and removing the crystals by fractionation.

As the preferable embodiment of fats and oils comprising 50 to 90 mass % of a XUX triglyceride in total triglycerides which are used in the production method of the present invention, it is preferable that such fats and oils are derived from a distillation residue (which comprises 50 mass % or more of a XOX triglyceride in a XUX triglyceride, O: an oleic acid) obtained by transesterifying fats and oils having 50 mass % or more of an oleoyl group on the second position with a fatty acid lower alkyl ester (which may comprise 0.01 to 10 mass % of a free fatty acid) and then distilling the reactant. A saturated fatty acid residue in a XOX triglyceride is preferably a saturated fatty acid residue having 16 to 22 carbon atoms, and more preferably a stearoyl group, a palmitoyl group or a behenoyl group. More specifically, such fats and oils can be obtained by the method which comprises the steps of adding a fatty acid lower alkyl ester to raw fats and oils such as trioleoylglycerol, low-melting-point part of shea butter (for example, iodine value 70 to 80), high-oleic sunflower oil, high-oleic low-linolenic rapeseed oil, high-oleic safflower oil, palm oil and palm fractionation oil; further acting 1,3-selective lipase such as *Rhizopus* lipase, *Aspergillus* lipase, *Mucor* lipase, pancreatic lipase and rice bran lipase to conduct transesterification; and then distilling the reactant and removing an unreacted raw material, by-product fatty acids such as an oleic acid or the lower alkyl esters thereof to obtain a distillation residue.

A fatty acid lower alkyl ester herein used is preferably lower alcohol esters of saturated fatty acids having 16 to 22 carbon atoms (preferably a palmitic acid, a stearic acid or a behenic acid), and particularly preferably esters with alcohols having 1 to 6 carbon atoms. Particularly, methanol, ethanol or isopropyl alcohol is preferable, and ethanol is further more preferable in terms of processing edible fats and oils.

The usage rate (molar ratio) of fats and oils having 50 mass % or more of an oleoyl group on the second position per a fatty acid lower alkyl ester is preferably ½ or less, and particularly preferably ½ to 1/30.

As the more preferable embodiment of fats and oils comprising 50 to 90 mass % of a XUX triglyceride in total triglycerides which are used in the production method of the present invention, it is preferable that, in the preparation of the above fats and oils comprising a XOX triglyceride, such fats and oils are derived from a distillation residue (which comprises 50 mass % or more of a XOX triglyceride in a XUX triglyceride, O: an oleic acid) obtained by multistage transesterification comprising the steps of transesterifying triglycerides having 50 mass % or more of an oleoyl group on the second position with a fatty acid lower alkyl ester (which may comprise 0.01 to 10 mass % of a free fatty acid); distilling a part of or all of the fatty acid lower alkyl ester to obtain a distillation residue; and then repeating the processes of newly adding a fatty acid lower alkyl ester to the distillation residue and reacting 1,3-selective lipase to conduct transesterification; and distilling a part of or all of the fatty acid lower alkyl ester to obtain a distillation residue. This embodiment is more preferable since the content of a XOX triglyceride can be effectively increased.

As the preferable embodiment of fats and oils comprising 50 to 90 mass % of a XUX triglyceride in total triglycerides which are used in the production method of the present invention, it is also preferable that they are fats and oils which comprise 50 mass % or more of a triglyceride having saturated fatty acid residues on the first and third positions and a linoleoyl group on the second position (XLX triglyceride, L: a linoleic acid) in a XUX triglyceride. A saturated fatty acid residue in a XLX triglyceride is preferably a saturated fatty acid residue having 16 to 22 carbon atoms, and more preferably a stearoyl group, a palmitoyl group or a behenoyl group.

Fats and oils comprising a XLX triglyceride can be obtained by the method which comprises the steps of, as with a XOX triglyceride, adding a saturated fatty acid lower alkyl ester having 16 to 22 carbon atoms (which may comprise 0.01 to 10 mass % of a free fatty acid) to fats and oils having 50 mass % or more of a linoleoyl group on the second position, more specifically, raw fats and oils such as trilinoleoylglycerol, high linoleic sunflower oil and high linoleic safflower oil; further acting 1,3-selective lipase to conduct transesterification; and then distilling the reactant to obtain a distillation residue. Further, such fats and oils can be obtained in a distillation residue obtained by multistage transesterification wherein the following steps are repeated once or more: newly adding a saturated fatty acid lower alkyl ester having 16 to 22 carbon atoms to the above distillation residue and reacting 1,3-selective lipase to conduct transesterification, and distilling the reactant.

As the preferable embodiment of fats and oils comprising 50 to 90 mass % of a XUX triglyceride in total triglycerides which are used in the production method of the present invention, it is also preferable that they are fats and oils which comprise 50 mass % or more of a triglyceride having saturated fatty acid residues on the first and third positions and a linolenoyl group on the second position (XLnX triglyceride, Ln: a linolenic acid) in a XUX triglyceride. A saturated fatty acid residue in a XLnX triglyceride is preferably a saturated fatty acid residue having 16 to 22 carbon atoms, and more preferably a stearoyl group, a palmitoyl group or a behenoyl group.

Fats and oils comprising a XLnX triglyceride can be obtained by the method which comprises the steps of, as with XOX triglyceride, adding a saturated fatty acid lower alkyl ester having 16 to 22 carbon atoms (which may comprise 0.01 to 10 mass % of a free fatty acid) to fats and oils having 50 mass % or more of a linolenoyl group on the second position, more specifically, raw fats and oils such as trilinolenoylglycerol, linseed oil, shiso oil and perilla oil; further acting 1,3-selective lipase to conduct transesterification; and then distilling the reactant to obtain a distillation residue. Further, such fats and oils can be obtained in a distillation residue obtained by multistage transesterification wherein the following steps are repeated once or more: newly adding a saturated fatty acid lower alkyl ester having 16 to 22 carbon atoms to the above distillation residue and reacting 1,3-selective lipase to conduct transesterification, and distilling the reactant.

1,3-Selective lipase is preferably *Rhizopus delemar* or *Rhizopus oryzae* of *Rhizopus* sp. Examples of these lipases include Picantase R8000 (a product of Robin) and Lipase F-AP 15 (a product of Amano Enzyme Inc.). The most preferable lipase is Lipase DF "Amano" 15-K (also referred to as Lipase D) derived from Rhizopus oryzae, a product of Amano Enzyme Inc. This product is a powdered lipase. Meanwhile, DF "Amano" 15-K was previously described as it is derived from *Rhizopus delemar*.

Lipases herein used may be those obtained by drying an aqueous solution of lipase which contains the medium component of the lipase, or the like. As powdered lipases, it is preferable to use those which is spherical and of which water content is 10 mass % or less. It is particularly preferable to use a powdered lipase of which 90 mass % or more have a particle size of 1 to 100 μm. Further, a powdered lipase is preferably produced by spray drying an aqueous solution of lipase of which pH is adjusted to 6 to 7.5.

It is also preferable to use a granulated powdered lipase (also referred to as a powdered lipase) which is produced by granulating the above lipase with soybean powder and powderizing it.

In addition, marketed immobilized lipases can be preferably used. Examples of such lipases include Lipozyme RM IM and Lipozyme TL IM, products of Novozymes.

As for transesterification reaction, the reaction can be conducted in accordance with the ordinary method, i.e. by adding the above lipase to a raw material which comprises fats and oils and a fatty acid lower alkyl ester (which may comprise 0.01 to 10 mass % of a free fatty acid). In such a case, it is preferable to conduct the transesterification reaction in the conditions that 0.01 to 10 parts by weight (preferably 0.01 to 2 parts by weight, and more preferably 0.1 to 1.5 parts by weight) of lipase per 100 parts by weight of a raw material is added thereto, at 35 to 100° C. (preferably 35 to 80° C., and more preferably 40 to 60° C.), for 0.1 to 50 hours (preferably 0.5 to 30 hours, and more preferably 1 to 20 hours). The reaction is preferably conducted by the batch method. The reaction temperature may be optional only if it is the temperature at which fats and oils, which are reaction substrates, dissolve and have an enzymatic activity. Since the most suitable reaction time changes depending on the enzyme additive amount, reaction temperature or the like, it can be appropriately adjusted.

After the transesterification (in the case of multistage transesterification, after the transesterification in the final phase), an unreacted raw material, by-product fatty acids or fatty acid lower alkyl esters are removed by distilling the reactant until their contents become 50 mass % or less to obtain fats and oils comprising 50 to 90 mass % of a XUX triglyceride in total triglycerides, which are used as a crystallization raw material in the present invention.

In the present invention, when conducting transesterification, it is allowed to adjust the content of a fatty acid lower alkyl ester so that it becomes 1 to 50 mass % (preferably 1 to 30 mass %, more preferably 4 to 25 mass % and most preferably 7 to 23 mass %) by using more than 50 mass % of a fatty acid lower alkyl ester in a raw material of the transesterification and controlling the distillation to leave the fatty acid lower alkyl ester in a distillation residue comprising fats and oils which comprise 50 to 90 mass % of a XUX triglyceride in total triglycerides, or by separately adding a fatty acid lower alkyl ester. Further, it is also allowed to remove an unreacted raw material (comprising a fatty acid lower alkyl ester), by-product fatty acids or the lower alkyl esters thereof as much as possible by distillation; and to newly add a fatty acid lower alkyl ester to fats and oils which comprise 50 to 90 mass % of a XUX triglyceride in total triglycerides, so that the content of the fatty acid lower alkyl ester becomes 1 to 50 mass % (preferably 1 to 30 mass %, more preferably 4 to 25 mass % and most preferably 7 to 23 mass %).

A fatty acid lower alkyl ester newly added thereto is not particularly limited, and preferably lower alcohol esters of fatty acids having 16 to 22 carbon atoms (for example, a palmitic acid, a stearic acid, an arachic acid, a behenic acid, an oleic acid, a linoleic acid or a linolenic acid), and particularly preferably esters thereof with alcohols having 1 to 6 carbon atoms. Particularly, methanol, ethanol or isopropyl alcohol is preferable, and ethanol is further more preferable in terms of processing edible fats and oils.

In the production method of the present invention, 0.01 to 5 mass % of a free fatty acid can exist in a crystallization raw material. The content of a free fatty acid is preferably 0.01 to 3 mass % and most preferably 0.01 to 1 mass %. The above range of a free fatty acid is preferable because fats and oils rich in a XUX triglyceride wherein the contents of a XXX triglyceride and a XX diglyceride are low can be efficiently obtained.

In the production method of the present invention, a fatty acid lower alkyl ester/a free fatty acid is, on a mass basis, preferably ≥10, and more preferably ≥20. The above range of a fatty acid lower alkyl ester/a free fatty acid is preferable because fats and oils rich in a XUX triglyceride wherein the contents of a XXX triglyceride and a XX diglyceride are low can be efficiently obtained.

The present invention provides a method comprising the steps of dissolving by heating thus prepared crystallization raw material which comprises 1 to 50 mass % of a fatty acid lower alkyl ester and 50 to 90 mass % of a XUX triglyceride in total triglycerides of fats and oils from that a fatty acid lower alkyl ester is excluded; and cooling the reactant with stirring and/or still standing to precipitate crystals comprising a XXX triglyceride and/or a XX diglyceride. At that time, it is preferable that such precipitation of crystals comprising a XXX triglyceride and/or a XX diglyceride is conducted at the temperature at which a XUX triglyceride hardly crystallizes (for example, 26 to 35° C. and preferably 26 to 28° C.). When a crystallization raw material is cooled down to the above temperature or temperature zone in the presence of a fatty acid lower alkyl ester, crystals comprising a XXX triglyceride and/or a XX diglyceride are relatively quickly precipitated compared to those of a XUX triglyceride, and thus, they can be separated from a XUX triglyceride. As for timing to separate (fractionate) crystals comprising a XXX triglyceride and/or a XX diglyceride, fractionation can be conducted when the SFC (solid fat content) of a crystallization raw material is preferably 0.5 to 15%, more preferably 0.5 to 10%, and further more preferably 0.5 to 6%.

The pressure filtration for conducting solid-liquid separation is preferably conducted with, for example, a press filter which is used for separation by filtration of palm oil or the like, and the solid-liquid separation of precipitated crystals is preferably conducted at the temperature at which precipitated crystals do not dissolve (for example, 20 to 35° C. and preferably 20 to 27° C.).

In the present invention, fats and oils rich in a XUX triglyceride wherein the contents of a XXX triglyceride and a XX diglyceride are low can be obtained in an olein part (a liquid part) by fractionating fats and oils through the cooling crystallization process. In fats and oils of the liquid part from that a fatty acid lower alkyl ester is excluded, the content of each of a XXX triglyceride and a XX diglyceride is decreased by 0.3 mass % or more, preferably 0.5 mass % or more, and further more preferably 1.0 mass % or more compared to the content thereof in fats and oils used as a crystallization raw material comprising 50 to 90 mass % of a XUX triglyceride in total triglycerides. The content of each of a XXX triglyceride and a XX diglyceride in fats and oils of the liquid part from that a fatty acid lower alkyl ester is excluded is preferably 0 to 3 mass %, more preferably 0 to 2 mass %, and further more preferably 0 to 1 mass %. The liquid part comprises a fatty acid lower alkyl ester at around 100 to 110% of the content thereof which a crystallization raw material comprises (if a crystallization raw material comprises 20 mass % of a fatty acid lower alkyl ester, the content thereof in a liquid part is 20 to 22 mass %). In the liquid part, the content of triglycerides of fats and oils from that a fatty acid lower alkyl ester is excluded is preferably 85 mass % (more preferably 90 mass % and most preferably 94 mass %), and the content of a XUX triglyceride in total triglycerides is 65 mass % or more, preferably 70 mass % or more, more preferably 75 mass % or more, and most preferably 80 mass % or more.

Further, the purification process, which is an optional process conducted after the above process, can be conducted in accordance with the ordinary method (such as steam distillation). According to this method, a fatty acid lower alkyl ester can be removed before producing an end product. Thus, it is possible to obtain fats and oils wherein the content of triglycerides is preferably 85 mass % (more preferably 90 mass % and most preferably 94 mass %); and the content of a XUX triglyceride in total triglycerides is 65 mass % or more, preferably 70 mass % or more, more preferably 75 mass % or more, and most preferably 80 mass % or more.

It is also allowed to conduct a usually operated purification process(es) of fats and oils such as deacidification, bleaching and deodorizing.

Fats and oils rich in a XUX triglyceride wherein the contents of a XXX triglyceride and a XX diglyceride are low obtained by the production method of the present invention can be particularly preferably used as a cocoa butter equivalent (hard butter). Chocolate products, for example, comprise a sugar component and a fat and oil component containing the above hard butter. It is preferable that the above hard butter is contained in the fat and oil component at a rate of 10 mass % or more, preferably 20 mass % or more, and further more preferably 30 mass % or more. As for a sugar component, any one which is used for chocolates is usable. Examples thereof include sucrose, fructose and mixtures thereof. Sugar alcohols such as sorbitol are also usable. In addition, other optional component(s) which is usually contained in chocolate products can also be contained. Examples thereof include emulsifying agents (usually, lecithin), flavoring agents, skim milk powder, and whole milk powder.

Further, fats and oils rich in a XUX triglyceride wherein the contents of a XXX triglyceride and a XX diglyceride are low obtained by the production method of the present invention can be preferably used as a raw material of processed fat and oil products such as margarine, shortening, filling and O/W cream by mixing them with one or more kinds of fats and oils selected from the group consisting of soybean oil, rapeseed oil, sunflower oil, corn oil, cotton seed oil, safflower oil, peanut oil, palm oil, cocoa butter, shea butter, coconut oil, palm kernel oil, beef tallow, lard, milk fat, and processed oils wherein the above oils are treated with fractionation, hydrogenation, transesterification or the like.

EXAMPLES

Next, Examples will further illustrate the present invention. They only explain the present invention and do not particularly limit the invention.
Analytical Method Analysis of triglycerides was conducted by gas chromatography based on JAOCS, vol. 70, 11, 1111-1114 (1993).

Symmetry of triglycerides was determined by silver ion column-HPLC based on the method of J. High Resolut. Chromatogr., 18, 105-107 (1995).

SFC was determined based on IUPAC. 2. 150 Solid Content determination in Fats by NMR.

Analysis of a fatty acid lower alkyl ester was conducted by gas chromatography.
Preparation of a Powdered Lipase Composition A Autoclave sterilization (121° C., 15 mins.) was previously conducted to an enzyme solution (150000 U/mL) of a trade name: Lipase DF "Amano" 15-K (also referred to as Lipase D), a product of Amano Enzyme Inc. A threefold amount of 10% aqueous solution of deodorized whole fat soy bean powder (fat content: 23 mass %; trade name: Alphaplus HS-600, produced by Nisshin Cosmo Foods, Ltd.) cooled down to around room temperature was added thereto with stirring. Then, the mixture was adjusted to pH 7.8 by 0.5N NaOH solution, and spray-dried (SD-1000, by Tokyo Rikakikai Co., Ltd.) to obtain a powdered lipase composition A.
(Preparation of a Distillation Residue 1 for Fractionating)

0.3 Mass % of the powdered lipase composition A was added to a mixture of 20 parts of high-oleic sunflower oil (trade name: Olein Rich, by Showa Sangyo Co., Ltd.) and 80 parts of ethyl stearate (trade name: Ethyl Stearate, by Inoue Perfumery MFG. Co., Ltd.), and stirred at 40° C. for 20 hours. An enzyme powder was removed by filtration to obtain a reactant 1. Thin-film distillation was conducted to the obtained reactant 1, and a fatty acid ethyl was removed from the reactant at distillation temperature of 180° C. to obtain a distillation residue 1 wherein the content of triglycerides is 95.3 mass % and the content of a fatty acid ethyl is 0.4 mass %. Each fractionation of Example 1 and Comparative Example 1 was conducted using the obtained distillation residue 1. Meanwhile, a distillate in the thin-film distillation was defined as a distillate 1. The results are shown in Table 1.

Example 1

320 g of the distillate 1 in the thin-film distillation was mixed with 1680 g of the distillation residue 1 to obtain a crystallization raw material wherein the content of a fatty acid ethyl is 16.1 mass % (wherein the content of an unsaturated fatty acid ethyl is 13 mass %) and the content of a free fatty acid is 0.3 mass %. The crystallization raw material was completely dissolved at 50° C. and cooled down with stirring at 27° C. for 3 hours. Then, solid-liquid separation was conducted to it by pressure filtration (compression pressure 7 kgf/cm$^2$; use of The Nisshin OilliO Group, Ltd. self-produced press filter) to obtain 139 g of a solid fat part and 1816 g of a liquid part.

Comparative Example 1

2000 g of the distillation residue 1 was used as a crystallization raw material and completely dissolved at 50° C. and cooled down with stirring at 27° C. for 3 hours. Then, solid-liquid separation was tried to be conducted to it by pressure filtration (compression pressure 7 kgf/cm$^2$; use of The Nisshin OilliO Group, Ltd. self-produced press filter), but the reactant became too sticky to conduct the separation.
(Preparation of a Distillation Residue 2 for Fractionating)

0.3 Mass % of the powdered lipase composition A was added to a mixture of 40 parts of high-oleic sunflower oil (trade name: Olein Rich, by Showa Sangyo Co., Ltd.) and 60 parts of ethyl stearate (trade name: Ethyl Stearate, by Inoue Perfumery MFG. Co., Ltd.), and stirred at 40° C. for 20 hours. An enzyme powder was removed by filtration to obtain a reactant 2. Thin-film distillation was conducted to the obtained reactant 2, and a fatty acid ethyl was removed from the reactant at distillation temperature of 180° C. 60 Parts of ethyl stearate were again added to 40 parts of the obtained distillation residue, and 0.3 mass % of the powdered lipase composition A was added thereto and stirred at 40° C. for 20 hours. An enzyme powder was removed by filtration to obtain a reactant 3. Thin-film distillation was conducted to the obtained reactant 3, and a fatty acid ethyl was removed from the reactant at distillation temperature of 140° C. to obtain a distillation residue 2 wherein the content of triglycerides is 75.2 mass % and the content of a fatty acid ethyl is 20.5 mass %. Fractionation of Example 2 was conducted using the obtained distillation residue 2. The results are shown in Table 1.

Example 2

2000 g of the distillation residue 2 (the content of a fatty acid ethyl is 20.5 mass % wherein the content of an unsaturated fatty acid ethyl is 8.6 mass %, and the content of a free fatty acid is 0.5 mass %) was used as a crystallization raw material and completely dissolved at 50° C. and cooled down with stirring at 27° C. for 2.5 hours. Then, solid-liquid separation was conducted to it by pressure filtration (compression pressure 7 kgf/cm$^2$; use of The Nisshin OilliO Group, Ltd. self-produced press filter) to obtain 155 g of a solid fat part and 1786 g of a liquid part.

TABLE 1

| | | (unit: mass %) | | |
| --- | --- | --- | --- | --- |
| | | Example 1 | Comp. Exam. 1 | Example 2 |
| fractionation raw material | XUX TG * | 72.9 | 72.9 | 76.5 |
| | (XOX TG therein) | (94) | (94) | (94) |
| | fatty acid ethyl ** | 16.1 | 0.4 | 20.5 |
| | (unsaturated fatty acid ethyl therein) | (13) | — | (8.6) |
| | XXX TG | 1.4 | 1.4 | 2.3 |
| | XX DG | 1.1 | 1.1 | 1.9 |
| | free fatty acid *** | 0.2 | — | 0.5 |
| SFC before filtration | | 3 | 4 | 4 |
| filtration condition | | good | impossible | good |
| liquid part | yield **** | 91 | — | 89 |
| | XUX TG * | 73.2 | — | 77.0 |
| | (XOX TG therein) | (94) | — | (94) |
| | XXX TG | 0.5 | — | 0.7 |
| | XX DG | 0.1 | — | 0.2 |

\* content of a XUX triglyceride in total triglycerides
\*\*, \*\*\* content in a fractionation raw material
\*\*\*\* a liquid part/a fractionation raw material × 100

(Production of Chocolates)

The liquid part (olein part) obtained in Example 2 was decolorized and deodorized in accordance with ordinary purification methods of fats and oils to obtain hard butter. 7.5 parts of this hard butter, 43.45 parts of sugar, 40.0 parts of cacao mass (oil content 55%), 1.0 part of cocoa butter, 7.5 parts of palm mid fraction, 0.5 part of lecithin and 0.05 part of a flavoring agent were blended. Then, rolling, conching, tempering and molding were conducted in accordance with the ordinary method to produce chocolates. The produced chocolates were easily separated from mold, flavorful and melted well in the mouth.

What is claimed is:

1. A method for producing fats and oils which comprises the steps of cooling fats and oils in a molten state comprising 50 to 90 mass % of a XUX triglyceride in total triglycerides and containing 0.5 to 6 mass % of a XXX triglyceride in the presence of 7-23 mass % of a fatty acid lower alkyl ester to precipitate crystals; and conducting solid-liquid separation to obtain fats and oils wherein a XXX triglyceride and a XX diglyceride are decreased in an olein part (a liquid part), wherein the XUX triglyceride is a triglyceride comprising saturated fatty acid residues on the first and third positions and an unsaturated fatty acid residue on the second position; the XXX triglyceride is a triglyceride comprising saturated fatty acid residues on all of the first to third positions; and the XX diglyceride is a diglyceride comprising saturated fatty acid residues on any two positions among the first to third positions.

2. The method for producing fats and oils according to claim 1, wherein the fats and oils comprising 50 to 90 mass % of a XUX triglyceride in total triglycerides and containing 0.5 to 6 mass % of a XXX triglyceride are derived from a distillation residue obtained by following steps A to C:
   A: a step of mixing a fatty acid lower alkyl ester and fats and oils comprising triglycerides rich in unsaturated fatty acid residues on the second position thereof to obtain a mixture;
   B: a step of transesterifying the mixture with 1,3-selective lipase to obtain a transesterified reactant; and
   C: a step of conducting distillation to the transesterified reactant and distilling a part or all of the fatty acid lower alkyl ester to obtain a distillation residue.

3. The method for producing fats and oils according to claim 1, wherein the fats and oils comprising 50 to 90 mass % of a XUX triglyceride in total triglycerides and containing 0.5 to 6 mass % of a XXX triglyceride are derived from a distillation residue of a multistage transesterification reactant obtained by conducting A-B-C and then repeating D-B-C once or more in following steps A to D:
   A: a step of mixing a fatty acid lower alkyl ester and fats and oils comprising triglycerides rich in unsaturated fatty acid residues on the second position thereof to obtain a mixture;
   B: a step of transesterifying the mixture with 1,3-selective lipase to obtain a transesterified mixture;
   C: a step of conducting distillation to the transesterified mixture and distilling a part or all of the fatty acid lower alkyl ester to obtain a distillation residue; and
   D: a step of mixing the distillation residue of above C and a fatty acid lower alkyl ester to obtain a mixture.

4. The method for producing fats and oils according to claim 1, wherein, fats and oils comprising a XUX triglyceride and a fatty acid lower alkyl ester are dissolved by heating and the dissolved fats and oils are cooled with stirring and/or still standing to precipitate crystals comprising a XXX triglyceride and/or a XX diglyceride, wherein a XXX triglyceride or a XX diglyceride is crystallized at the temperature at which a XUX triglyceride hardly crystallizes; and the solid-liquid separation is conducted to obtain an olein part (a liquid part).

5. The method for producing fats and oils according to claim 4, wherein the crystallization is conducted at 20 to 35° C.

6. The method for producing fats and oils according to claim 4, wherein the solid-liquid separation is conducted by pressure filtration.

7. A hard butter comprising the fats and oils produced according to claim 1.

8. A food comprising the hard butter according to claim 7.

\* \* \* \* \*